(12) United States Patent
Phillibert et al.

(10) Patent No.: US 12,500,809 B1
(45) Date of Patent: Dec. 16, 2025

(54) NETWORK ROUTING ANOMALY DETECTION

(71) Applicant: Amazon Technologies, Inc., Seattle, WA (US)

(72) Inventors: Jonathan Phillibert, Seattle, WA (US); Kushal Mall, Issaquah, WA (US); Thomas Bradley Scholl, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 426 days.

(21) Appl. No.: 18/067,212

(22) Filed: Dec. 16, 2022

(51) Int. Cl.
*H04L 41/0654* (2022.01)
*H04L 45/02* (2022.01)

(52) U.S. Cl.
CPC .......... *H04L 41/0654* (2013.01); *H04L 45/02* (2013.01)

(58) Field of Classification Search
None
See application file for complete search history.

(56) References Cited

U.S. PATENT DOCUMENTS

| | | | |
|---|---|---|---|
| 10,320,813 B1* | 6/2019 | Ahmed | H04L 63/1416 |
| 2018/0375886 A1* | 12/2018 | Kirti | H04L 67/10 |
| 2019/0098046 A1* | 3/2019 | Schlamp | H04L 63/1416 |
| 2020/0162496 A1* | 5/2020 | Medalion | H04L 63/1416 |
| 2021/0135982 A1* | 5/2021 | Chaturmohta | H04L 45/04 |
| 2021/0194918 A1* | 6/2021 | Earl | H04L 45/04 |

* cited by examiner

*Primary Examiner* — Lonnie V Sweet
(74) *Attorney, Agent, or Firm* — Klarquist Sparkman, LLP

(57) ABSTRACT

In a computer networking system, data is transmitted through a network based on advertised routes. The disclosure provides mechanisms for detecting anomalies in network routing by analyzing autonomous system (AS) paths in data corresponding to Border Gateway Protocol (BPG) messages. The AS path information from the BGP message data may be evaluated to detect different types of anomalies, which may be reported to a management entity for further review or mitigation.

18 Claims, 8 Drawing Sheets

NETWORK ROUTING ANOMALY DETECTION

BACKGROUND

Large computer networks, such as those used in cloud computing, may contain hundreds or thousands of components of several types, such as switches, routers, and hubs, which are interconnected with links. Generally, network routers receive packets on input ports and transmit the received packets to output ports based on a configuration of the network router. A forwarding table controls which next hops receive the packets. Typically, the forwarding table is programmed in accordance with routing strategies that control the propagation of data to a destination over a selected path or paths. The paths may be identified based on advertisements propagated by network devices, such as transit routers.

DETAILED DESCRIPTION

Modern high-scale global backbone networks may connect a data center or other service to other large networks in other areas (e.g., to other networks/devices distributed around the world). Advertisements, such as Border Gateway Protocol (BGP) advertisements, may be used by routers in a network to identify paths through the routers to other devices of the network, in order to propagate traffic through the network. The advertisements may be sent directly between routers in a peer group, and/or routers may serve as route reflectors by propagating incoming advertisements to a group of client routers according to established advertisement rules. In some instances, however, the rules of advertisement propagations may be compromised, and/or other anomalies in route advertisements may arise. For example, an unauthorized entity may attempt to spoof legitimate routes or advertisements, or a route reflector may propagate a route advertisement in an unauthorized manner (e.g., out to the Internet, or otherwise to routers not included in a specified client list). The present disclosure provides approaches to detect (and, in some examples, mitigate) such routing anomalies.

Figure 1:
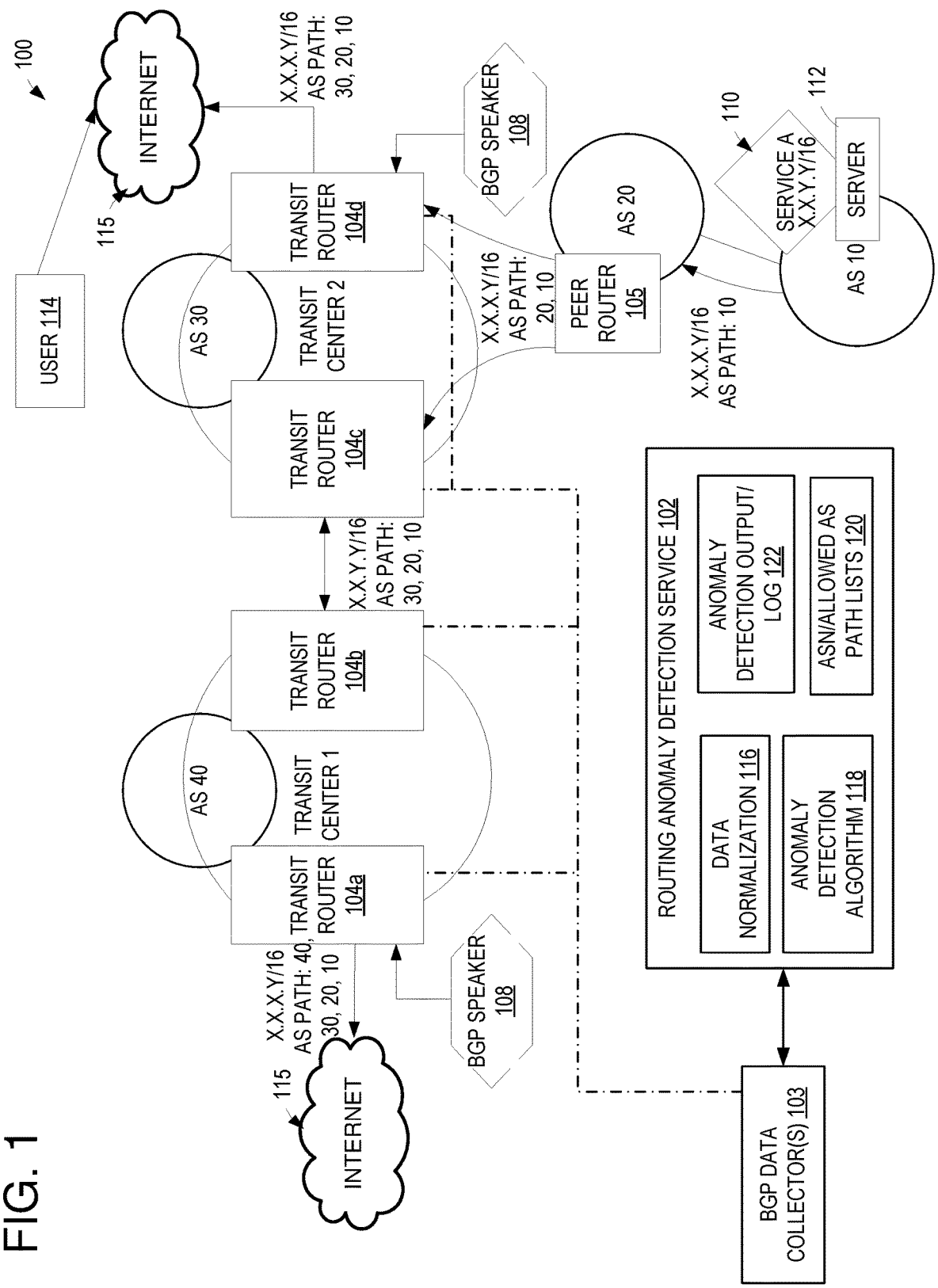
FIG. 1 shows an example system for detecting routing anomalies indicated by Border Gateway Protocol (BGP) messages.

FIG. 1 shows an example routing anomaly detection system 100 that includes a network of devices connected to one another and to the Internet. The system 100 further includes a routing anomaly detection service 102 configured to analyze Border Gateway Protocol (BGP) advertisements, including detecting anomalies in Autonomous System (AS) paths of the advertisements, as described in more detail below. The network may be organized into multiple regions, illustrated in FIG. 1 as transit centers, each comprising at least one transit router 104a-104d. The transit routers 104a-104d may each communicate with a respective BGP speaker 108 (two of which are illustrated for representation), which controls the propagation of routing advertisements advertised by the transit routers. For example, each transit center may serve data for the services that are located adjacent to that transit center and announce routes to those services out to the Internet and across a backbone network. Each BGP speaker 108 can be implemented using one or more servers and/or network devices.

As an illustrative example, in FIG. 1, a service A 110 provided by and/or including server 112 is located adjacent to transit center 2 and thus in communication with the transit routers 104c and 104d in transit center 2 via a peer router 105. Accordingly, under some operating conditions, the transit routers 104a-104d may advertise a route to the service 110/server 112 (e.g., "X.X.Y.Y/16" in the illustrated example) after receiving a propagation of a route advertisement from peer router 105. As the server 112 is in a different Autonomous System (AS) from the peer router 105 and the transit routers 104a-104d, the AS path of the advertised route may expand each time the advertisement is propagated to another AS. It is to be understood that the AS paths shown in FIG. 1 are illustrative examples for advertisements that are propagated through the system 100. In some examples, as shown, the advertisement of the route (e.g., X.X.Y.Y/16) from AS 10 may be sent with an AS path of AS 10, such that each subsequent advertisement of the path includes AS 10 as the originating AS in the AS path.

Accordingly, under some operating conditions, when a user 114 attempts to connect to service A 110, the connection may propagate over the Internet (represented at 115) to the transit router 104d that is in the same region as the service 110, due to the announcement of the route "X.X.Y.Y/16" advertised from the transit router out to the Internet, using a route corresponding to the AS path of the advertisement propagated out to the Internet for routing traffic including data sent by the user device 114 for receipt and/or processing by service A.

As described above, the propagation of advertisements may be subject to rules and may experience anomalous activity, such as AS number (ASN) spoofing or route leaking. In order to detect these anomalies, the routing anomaly detection service 102 may subscribe to a feed of BGP messages (and/or representations thereof) relating to targeted ASNs in order to perform a series of evaluations on AS paths and other BGP message data from advertisements. For example, the advertisements sent by the routers in the network may be detected by one or more data collectors 103 configured to monitor the network. Representations, copies, and/or other data indicative of the BGP messages (e.g., BGP message data) relating to a subscribed feed may be provided to a data normalization service 116 in the routing anomaly detection service, configured to normalize the received BGP message data into format and content that is suitable for analysis by an anomaly detection algorithm 118. In this way, the data may be normalized prior to analyzing the AS path. For example, the anomaly detection algorithm 118 may include one or more evaluations to be performed on AS paths, prefixes, and/or other BGP data from the representations of BGP messages received from the BGP data collectors 103 to determine if the AS paths are anomalous (e.g., indicate a probable spoof, route leak, or other anomaly). Examples of evaluations that may be performed by the algorithm 118 are described in more detail below with respect to FIGS. 2 and 3. The algorithm 118 may also include exceptions, such as ASNs and/or AS paths that are exempt from further evaluation at a specified point in executing the algorithm, and these exceptions may be stored as ASN/allowed path lists 120 in some examples. A result of performing the anomaly detection algorithm 118 may be stored and/or output using the anomaly detection output/log service 122. For example, the output/log service 122 may be configured to log anomalous or non-anomalous findings from the analysis performed by algorithm 118 and/or issue alerts responsive to anomalous findings from the analysis performed by algorithm 118. In some examples, the output/log 122 may output an alert to a management system for presentation to an operator, administrator, or other user for further analysis and/or mitigation of the anomaly.

Figure 2:
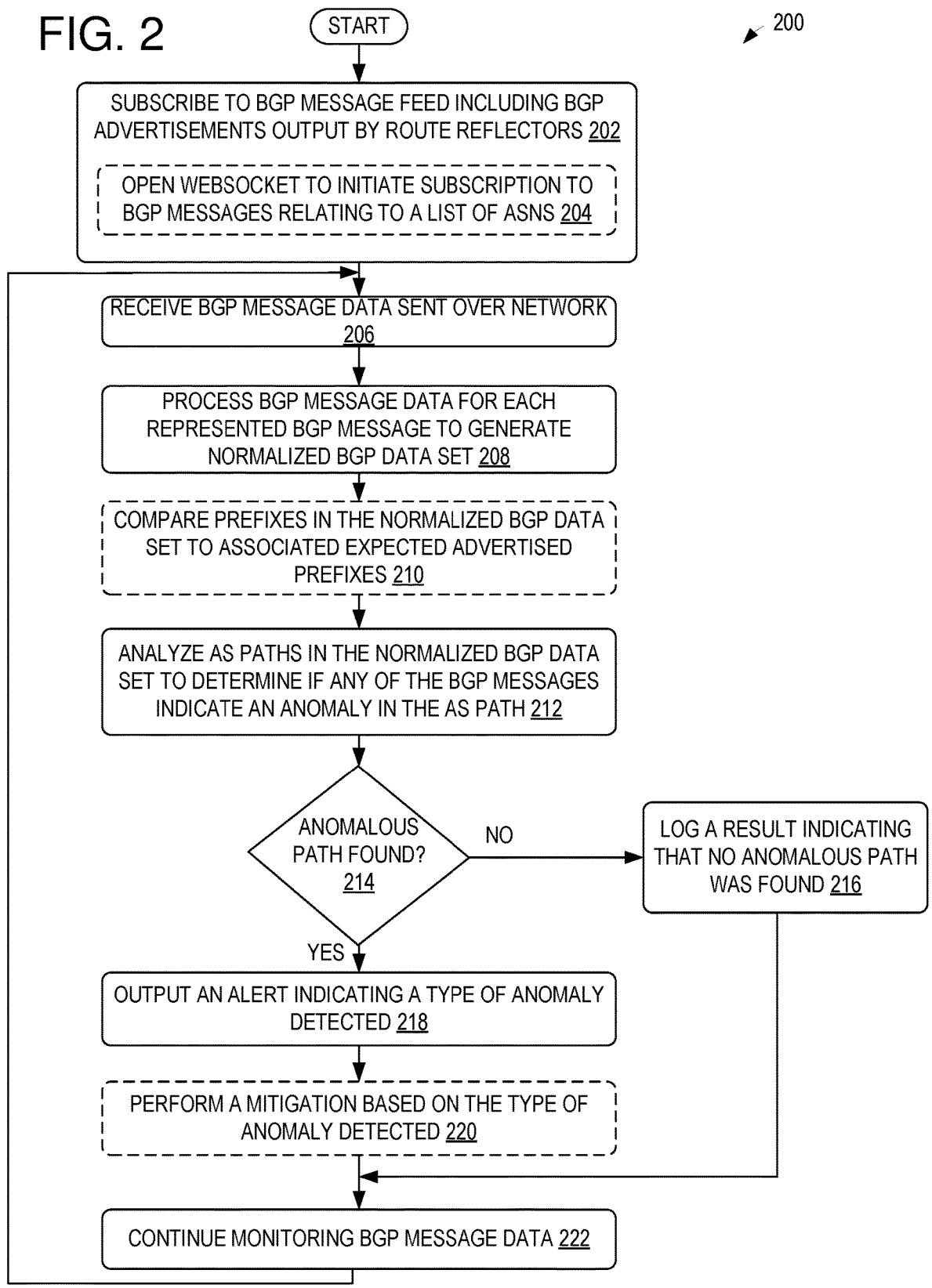
FIG. 2 is a flow chart of an example method for detecting routing anomalies using the BGP messages.

FIG. 2 shows an example method 200 for detecting routing anomalies using BGP messages. For example, method 200 may be performed by the routing anomaly detection service 102 of FIG. 1 in coordination with other components of FIG. 1. At 202, the method includes subscribing to a BGP message feed that includes BGP advertisements (and/or representations thereof) output by route reflectors (or other route advertisers) in a network. As indicated at 204, subscribing to the feed may optionally include opening a web socket to initiate the subscription, where the subscription includes a request for BGP messages (e.g., all BGP messages or all BGP advertisements) relating to a list of ASNs (e.g., that include or originate from at least one of the ASNs in the list). In other examples, other mechanisms for subscribing to BGP message data may be performed, such as performing an Application Programming Interface (API) call to initiate a data exchange session with one or more data collectors in the network. As another example, subscribing to the BGP message feed may additionally or alternatively include initiating a BGP session between the routing anomaly detection service (and/or one or more data collectors, such as data collectors 103 of FIG. 1) and one or more of the route reflectors and request each respective route reflector of the one or more route reflectors to send all BGP advertisements that are received and/or propagated by the respective route reflector to the routing anomaly detection service and/or data collector(s).

At 206, the method includes receiving data for BGP messages sent over the network. For example, representations of all BGP messages (e.g., relating to the list of ASNs) may be received at the anomaly detection service from one or more data collection devices (e.g., data collectors 103 of FIG. 1) substantially continuously as long as the web socket is open. In some examples, the anomaly detection service may be configured to restart the web socket (e.g., re-subscribe to BGP messages) once the web socket expires (e.g., responsive to determining that no BGP message data or other data has been received from associated data collector(s) for a threshold period of time, such as two seconds).

At 208, the method includes processing BGP message data for each represented BGP message received at 206 (e.g., received in accordance with the subscription initiated at 202) to generate a normalized BGP data set. In some examples, each represented BGP message in the BGP message data received at 206 is processed and analyzed individually (e.g., the BGP data set is specific to a single BGP message, and a BGP data set is generated for each BGP message representation received via the subscription) as the message is received (or according to a processing queue). In other examples, BGP message data may be batch processed (e.g., representations of selected messages or all messages received in a selected time frame may be processed together). Examples of normalizing the BGP message data may include extracting and/or reordering/reformatting information from the representations of BGP messages, such as AS path information and prefixes, and/or removing superfluous information, such as duplicate messages/AS paths/ASNs, portions of AS paths, etc.

At 210, the method optionally includes comparing prefixes in the normalized BGP data set to associated expected advertised prefixes. For example, the analysis performed at 210 may determine whether the routes being advertised in the network match the original advertisement for that route. Responsive to detecting a mismatch in the prefixes of the normalized BGP data relative to the associated expected prefixes, the method may include outputting an alert indicating the mismatch and/or other details of the BGP data set. In some examples, the detection of the mismatch may result in a termination of the analysis (e.g., the method may effectively proceed to 218, where the mismatch is the type of anomaly indicated) of the associated AS path or BGP message.

At 212, the method includes analyzing AS paths in the normalized BGP data set to determine if any of the BGP messages indicate an anomaly in the AS path. For example, the BGP data set may be applied to an algorithm configured to step through a series of checks/evaluations to detect evidence of different types of anomalies. An example of the series of checks/evaluations is described in more detail below with respect to FIG. 3.

At 214, the method includes determining whether an anomalous path was found in the BGP data set. If no anomalous path is found (e.g., "NO" at 214), the method may include logging a result indicating that no anomalous or suspicious path was found, as indicated at 216. The method may then include continuing the monitoring of BGP messages, as indicated at 222.

Alternatively, if an anomalous path is found (e.g., "YES" at 214), the method includes outputting an alert indicating a type of anomaly detected, as indicated at 218. For example, the alert may identify the anomaly as being evidence of a spoofing attempt, route leak, and/or other type of anomaly, as described in more detail below with respect to FIG. 3. The alert may be output to a management entity, such as a ticketing system or queue for review by an operator or administrator of the network. In additional or alternative examples, the alert may be output to an automated system configured to perform additional actions based on the alert. For example, as indicated at 220, the method optionally includes performing a mitigation based on the type of anomaly detected. In examples where the alert is provided to an operator or administrator, that operator or administrator may perform or trigger performance of the mitigation. In examples where the alert is provided to an automated system, the automated system may include instructions executable to automatically perform a selected mitigation based on the type of anomaly detected (e.g., different types of mitigation may be performed for different types of anomalies in some examples). For example, the mitigation may include withdrawing the advertised route from the network, advertising a new or updated route to routers of the network (e.g., with a more specific prefix to win back traffic in examples where a detected anomaly suggests a spoof or hijack attempt), issuing an alert of the anomaly to other entities, etc. Following the output of the alert and/or the mitigation, the method may include continuing to monitor BGP message data, as indicated at 222. Furthermore, it is to be understood that a logging operation, similar to that described above at 216, may be performed responsive to a finding of an anomalous path (e.g., indicating details of the BGP message that was analyzed, the analysis that was performed, the type of anomaly found, etc.).

Figure 3:
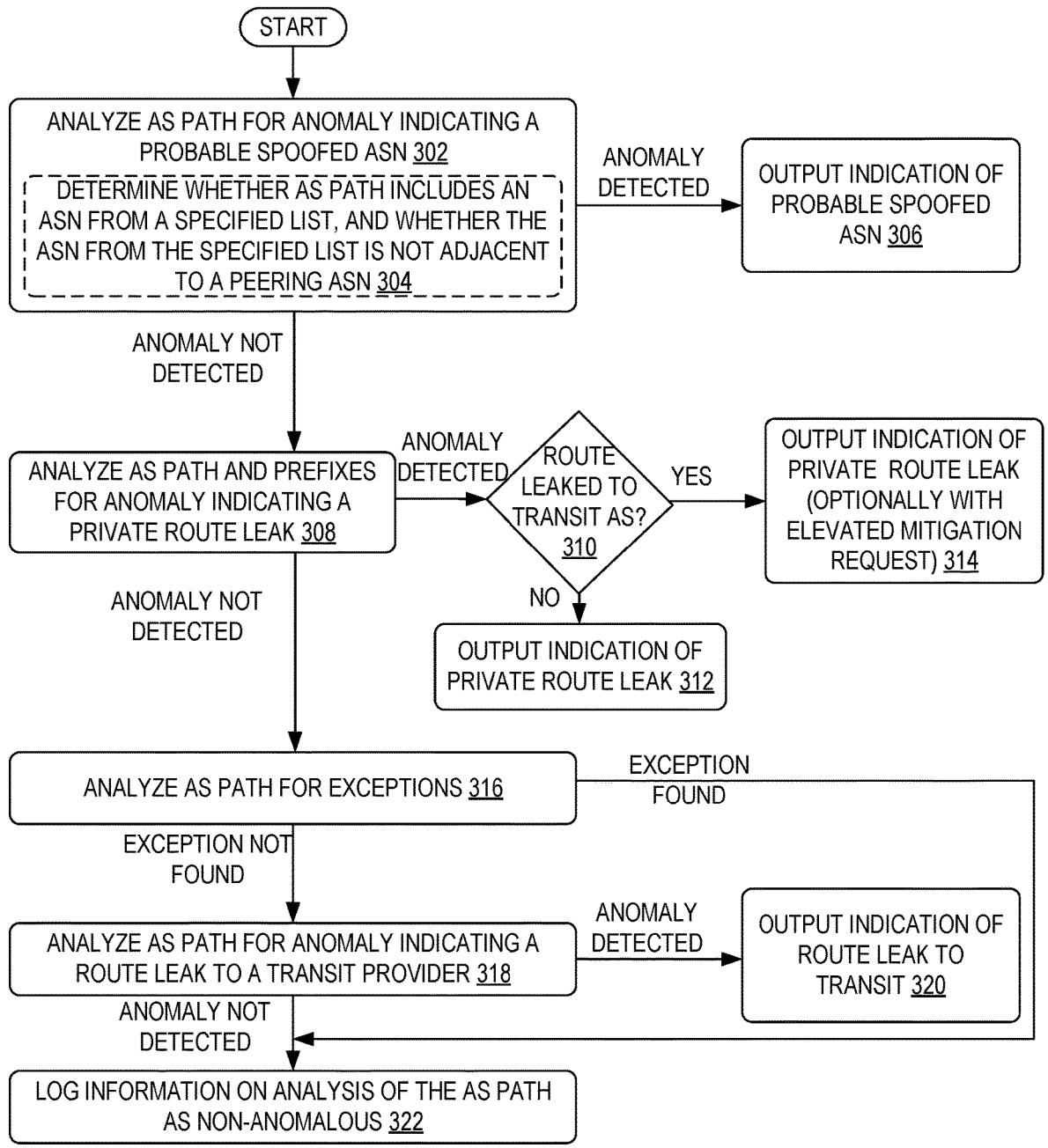
FIG. 3 is a flow chart of an example method for determining different types of anomalies based on the BGP messages.

FIG. 3 shows an example method 300 for detecting different types of routing anomalies using BGP messages. For example, method 300 may be performed by the routing anomaly detection service 102 of FIG. 1 in coordination with other components of FIG. 1. In some examples, one or more of the operations of method 300 may be performed at 212 of method 200 of FIG. 2 to analyze AS paths using received BGP message data. The analysis performed in method 300 may be applied to each AS path of a given set of BGP message data; for example, for each received representation of a BGP advertisement, the corresponding AS path (e.g., optionally normalized as described above with respect to FIG. 2 to remove less relevant portions) included therein may be analyzed using method 300. It is to be understood that the number and types of analysis shown in FIG. 3 are exemplary, and the analysis performed at 212 of method 200 may include more, fewer, and/or different evaluations than those shown in FIG. 3. Furthermore, in some examples, the analysis shown in FIG. 3 may be performed serially, such that the method ends (or returns to analyze a next AS path of a next BGP message representation) once a terminating operation is reached (e.g., an anomaly is found, an exception is identified, or all of the evaluations are performed, as described in more detail below). In other examples, one or more of the analyses may be performed in parallel with one another.

At 302, the method includes analyzing an AS path for an anomaly indicating a probable spoofed ASN. For example, as indicated at 304, the analysis for a spoofing-related anomaly may include determining whether the AS path includes ASNs from a specified list of ASNs and whether an ASN from the list is not adjacent to a peering ASN. In some examples, a list of ASNs (e.g., selected ASNs of an organization and/or otherwise ASNs that have a known relationship to peering ASNs) may be stored in and/or may be accessible to the routing anomaly detection service. If an ASN in the list is detected as being in the AS path in an unauthorized and/or unexpected position (e.g., if an ASN in the list is not adjacent to a peering ASN), then the associated route/advertisement may be identified as being anomalous (e.g., an anomaly is detected). For example, the analysis at 302 may include determining whether a respective ASN directly adjacent (e.g., to the left) of any ASNs from the list that appear in the AS path is a peering ASN and, if not, determining that an anomaly is found. If an anomaly is detected, the method includes outputting an indication of a probable spoofed ASN, as indicated at 306.

If an anomaly is not detected according to the analysis at 302, the method includes analyzing the AS path and prefixes for an anomaly indicating a private route leak, as indicated at 308. For example, a system may be configured to include specified ASNs that are used for external peering, but do not typically show up on AS paths in advertisements sent out to the Internet. Accordingly, the analysis at 308 may include checking the AS path for an ASN that is in such a specified list (e.g., a private ASN), and determine whether the originator of the associated advertisement (or the ASN directly to the left of the private ASN) is a known internal ASN (e.g., within a list of ASNs corresponding to a managing organization of the system or within another list of ASNs approved to advertise routes that traverse the private ASN); if not, the route may be determined to be anomalous (e.g., a private route leak), and the method may proceed to 310 to determine an urgency of the anomaly by determining whether the route was leaked to a transit AS (e.g., having an ASN in a list of transit providers). For example, if a next ASN in the AS path after the private ASN is a transit ASN, the system may determine that the route was leaked to a transit AS If the route is not leaked to a transit ASN (e.g., "NO" at 310), the method includes outputting an indication of a private route leak, as indicated at 312. For example, the private ASN that is leaking the route may be notified of the leak. If the route is leaked to a transit ASN (e.g., "YES" at 310), the method includes outputting an indication of the private route leak, and optionally includes performing or including a suggestion for an elevated mitigation request, as indicated at 314. For example, the elevated mitigation request may include requesting the transit AS corresponding to the transit ASN in the AS path to withdraw the advertisement corresponding to the AS path (e.g., in addition to notifying the owner/administrator of the private ASN and/or performing other alerting).

Returning to 308, if an anomaly is not detected according to the analysis at 308 (e.g., if the originator/adjacent ASN is a known internal ASN or within the list of ASNs approved to advertise routes that traverse the private ASN as described above), the method includes analyzing the AS path for one or more exceptions (e.g., exceptions that are predefined), as indicated at 316. For example, route leaks from selected permitted ASNs (e.g., an unexpected ASN appears in an AS path that originates at a selected ASN or client type) or specific allowed AS paths may be exempted from further analysis. As described above with respect to FIG. 1, a list of ASNs or allowed AS paths relating to the exemptions may be stored (e.g., as lists 120 of FIG. 1). For example, an exception may be found if the AS path or a subset of the AS path is included in a list of allowed AS paths or allowed ASNs. Accordingly, if an exception is found, the method may include logging information on the analysis of the AS path with an indication that the path was found to be non-anomalous, as indicated at 322. The logging may thus be performed without performing additional analysis on the AS path. In this way, finding an exception at 316 results in a determination that the AS path is non-anomalous.

If an exception is not found according to the analysis at 316, the method includes analyzing the AS path for an anomaly indicating a route leak to a transit provider, as indicated at 318. For example, the AS path may be analyzed to determine if the advertisement crossed a transit router/provider (e.g., the AS path includes an ASN included in a list of transit ASNs. In some examples, a transit provider may include ASes in an organization that are configured to carry traffic to other ASNs per an agreement. If the AS path includes a transit ASN, the adjacent ASN (e.g., directly to the right) of the transit ASN is analyzed to determine if the adjacent ASN is another transit ASN or a peering ASN. If not, the system determines the AS path and associated route to be anomalous. For example, the analysis at 318 is performed to determine whether a transit ASN is receiving an advertisement from a non-peering ASN (and if so, an anomaly is detected). If an anomaly is found, the method includes outputting an indication of the route leak to transit (e.g., optionally including an identification of the ASN responsible for the leak, such as the ASN directly to the right of the transit ASN in the AS path), as indicated at 320. If an anomaly is not detected according to the analysis at 318 (or otherwise if all analysis of the algorithm are performed without detection of an anomaly in the AS path), the method includes logging the information on the analysis of the AS path as non-anomalous, as indicated at 322.

As described above with respect to operation 218 of FIG. 2, the outputs at 306, 312, 314, and/or 320 may be provided in the form of an alert to an operator or administrator (e.g., displayed on a graphical user interface of a corresponding operator or administrator computing device, such as within a dashboard for managing/monitoring the network). In some examples, the outputs at 306, 312, 314, and/or 320 may be placed in a queue and/or subjected to deduping logic (e.g., to remove duplicate alerts).

Figure 4:
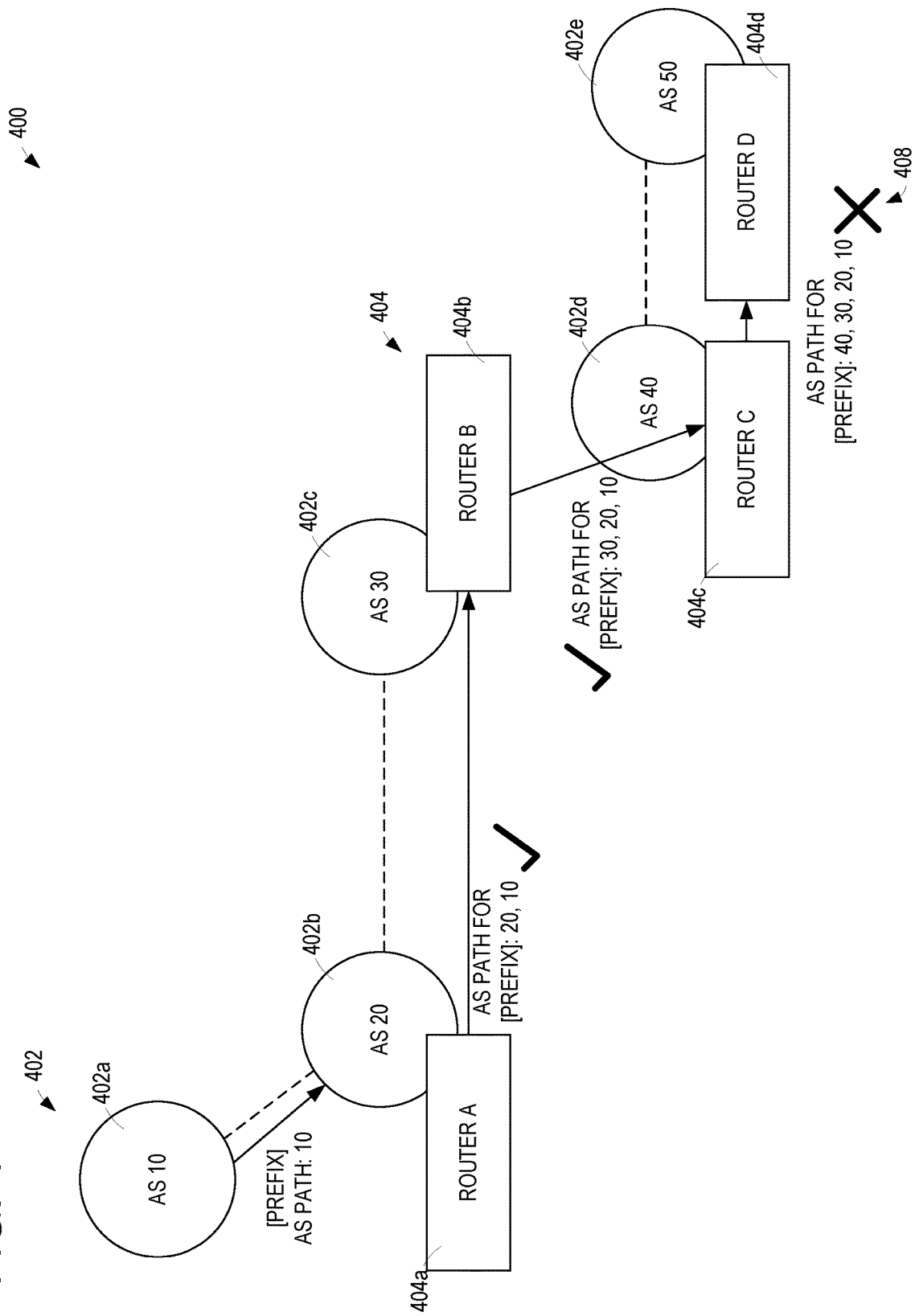
FIG. 4 schematically shows an example of a routing anomaly corresponding to a route leak, which may be detected using the disclosed technologies.

FIG. 4 schematically shows an example route advertisement leak scenario that may be detected using the technologies described herein, such as the anomaly detection methodologies of FIGS. 2 and 3 using the routing anomaly detection service 102 of FIG. 1. As shown in FIG. 4, a computing network 400 may include multiple Autonomous Systems (ASes) 402, shown representatively as AS 10 (402*a*), AS 20 (402*b*), AS 30 (402*c*), AS 40 (402*d*), and AS 50 (402*e*). The network 400 may also include multiple routers 404, shown representatively as router A (404*a*), router B (404*b*), router C (404*c*), and router D (404*d*). In the illustrated example, router A 404*a* of AS 20 advertises a route (e.g., an advertisement of a route between AS 20 and AS 10 for the prefix advertised by AS 10) to router B 404*b*, router B 404*b* may be configured to automatically re-advertise that route to router C 404*c*. In the example shown in FIG. 4, router A 404*a* may advertise a direct route to AS 10 via AS 20, resulting in an AS path for the route advertised from router A comprising AS 20, AS 10. Accordingly, the router B 404*b* may correctly re-advertise the route to router C 404*c* of AS 30, indicating that traffic arriving at router C may reach AS 10 via AS 20, and appending its ASN to the end of the AS path, resulting in the AS path of 30, 20, 10 for the advertised route out of AS 30. Router B 404*b* may also be configured to tag the advertised route with metadata indicating whether the route is intended to be readvertised to other peers. As shown at 408, in the instance of a route leak, router C 404*c* may re-advertise the route received from router B 404*b* out to a router D 404*d* in an unauthorized manner. For example, router B 404*b* may inadvertently include inaccurate metadata in the advertisement indicating that re-advertisement is allowed to routers that are not peers of router B, causing router C 404*c* to re-advertise the route to router D 404*d* (e.g., a peer of router C and not of router B), or router C 404*c* may misinterpret the metadata in the advertisement and re-advertise the route despite accurate metadata indicating that the route is not intended to be re-advertised to peers of router C. As described in more detail above with respect to FIG. 3, the disclosed technologies may be used to detect this route leak via an analysis of AS paths in received BGP messages. For example, a routing anomaly detection service (e.g., service 102 of FIG. 1) may receive representations of BGP message data that includes the advertisement sent from router C 404*c* to AS 50, and an analysis of the AS path in that advertisement may indicate that the route was advertised to an AS that is not a known client/peer of the router B 404*b*. As a result of the analysis, the route anomaly detection service may output an alert, as described above with respect to FIG. 4.

Figure 5:
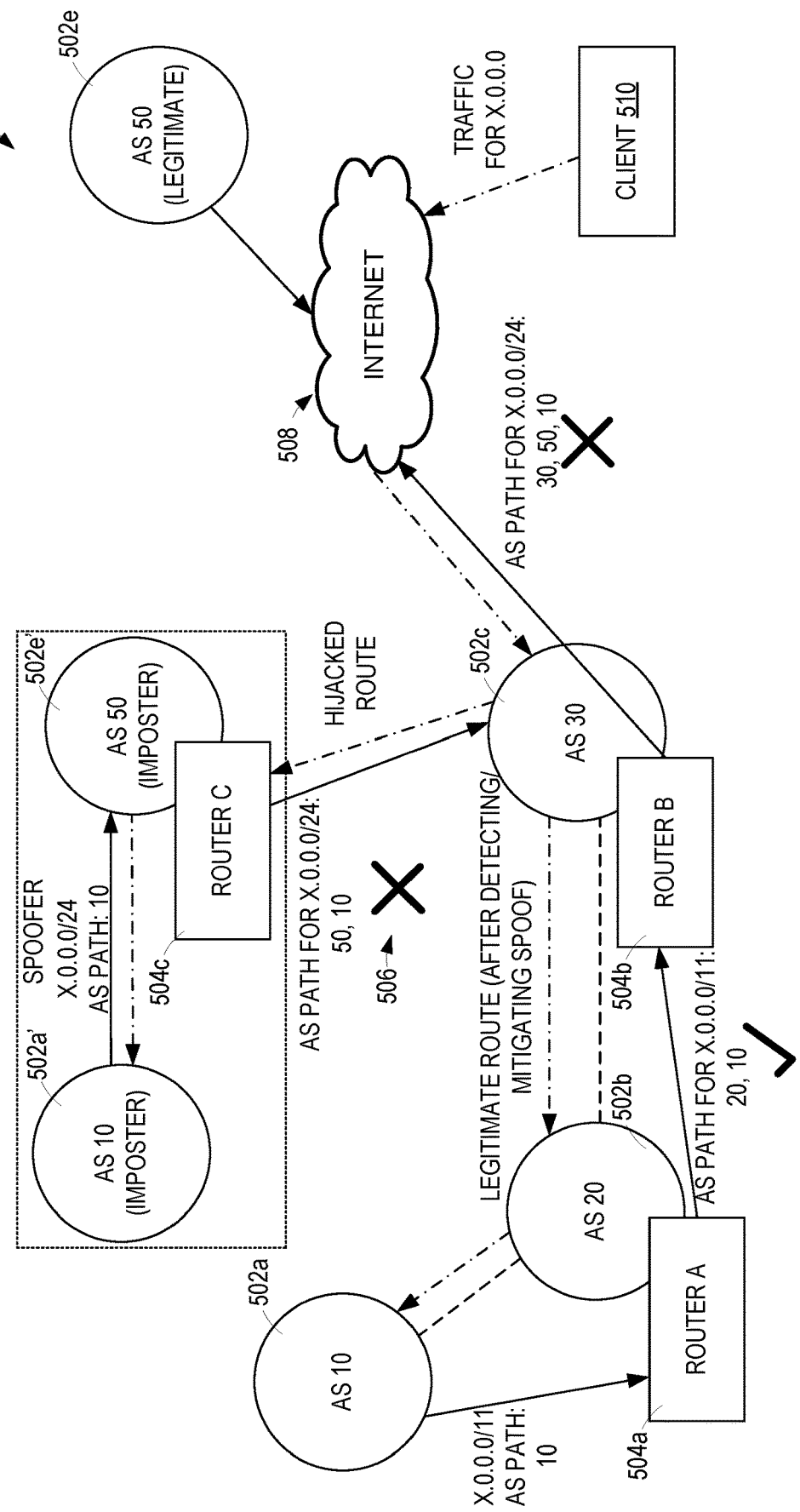
FIG. 5 schematically shows an example of a routing anomaly corresponding to a route spoofing attempt, which may be detected using the disclosed technologies.

FIG. 5 schematically shows an example route advertisement spoofing scenario that may be detected using the technologies described herein, such as the anomaly detection methodologies of FIGS. 2 and 3 using the routing anomaly detection service 102 of FIG. 1. As shown in FIG. 5, a computing network 500 may include multiple Autonomous Systems (ASes) 502, shown representatively as AS 10 (502*a*), AS 20 (502*b*), AS 30 (502*c*), AS 10 (Imposter) (502*a'*), AS 50 (Imposter) (502*e'*) and AS 50 (502*e*). The network 500 may also include multiple routers 504, shown representatively as router A (504*a*), router B (504*b*), and router C (504*c*). Similarly to the scenario depicted in FIG. 4, AS 10 may advertise a prefix, such as X.0.0.0/11 to AS 20, and router A 504*a* may advertise a route to AS 10 for that prefix (indicating that traffic can reach AS 10 via AS 20). Accordingly, the AS path for the advertisement for X.0.0.0/11 leaving AS 20 is 20, 10. AS 10 (Imposter) 502*a'* and AS 50 (Imposter) 502*e'* may be imposter ASes, spoofing legitimate ASNs on the network. For example, AS 50 (Imposter) 502*e'* may be an imposter of AS 50 502*e* and AS 10 (Imposter) 502*a'* may be an imposter of AS 10 502*a*. The spoofers may learn of the advertisement of route X.0.0.0/11 and generate a synthetic advertisement of a more specific prefix corresponding thereto, as shown in the illustrative example by the advertisement from AS 10 (Imposter) to AS 50 (Imposter) of X.0.0.0/24. Router C 504*c* may re-advertise that prefix to router B 504*b* in AS 30 502*c*, appending its spoofed ASN (AS 50), resulting in an AS path of 50, 10. As ASes 50 and 10 are legitimate ASNs in the network, the route may be accepted by router B and propagated out to the Internet 508 with the AS path 30, 50, 10. Accordingly, traffic (e.g., data, represented by the data lines shown in dot-dash form) for X.0.0.0 from client 510 may be propagated along the hijacked route that traverses imposter ASes 50 (Imposter) 502*e'* and 10 (Imposter) 502*a'*.

The disclosed technologies may be used to detect the spoofing scenario depicted in FIG. 5 by analyzing the AS path of advertisements and determining that the AS path of the advertisement sent by router B 504*b* includes an ASN (AS 10 (Imposter)) that, according to advertisement rules, is expected to appear adjacent to a peering ASN (e.g., AS 20 502*b*), but instead appears adjacent to a non-peering ASN (e.g., AS 50). Accordingly, the detection of the spoof may result in an output of an alert that is useable to mitigate the anomaly (e.g., performing an operation to win back the traffic, such as advertising a more specific prefix for X.0.0.0 [or a prefix with matching specificity], withdrawing the spoofed advertisements, etc.), resulting in traffic (e.g., data, represented by the data lines shown in dot-dash form) from client 510 for X.0.0.0 flowing along the legitimate route from AS 30 to AS 20 to (legitimate) AS 10.

Figure 6:
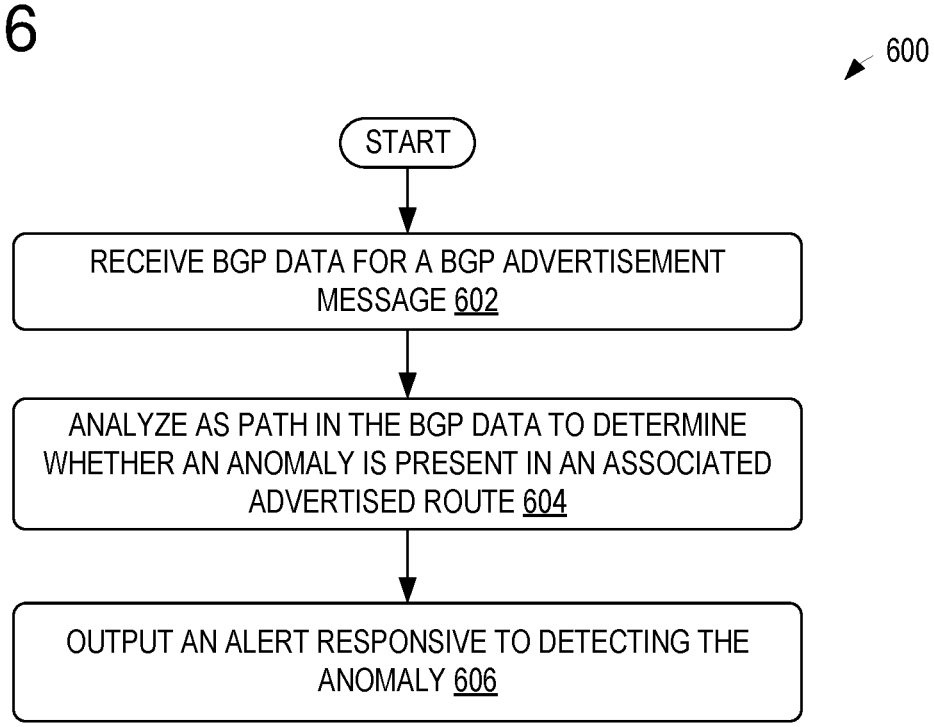
FIG. 6 is a flow chart of another example method for detecting anomalies using BGP messages.

FIG. 6 shows an example method 600 for detecting routing anomalies in a network using BGP messages. For example, method 600 may be performed by routing anomaly detection service 102 of FIG. 1 in coordination with other components of FIG. 1. In some examples, method 600 may further include one or more of the operations described above with respect to FIGS. 2 and 3 and/or any other operations described herein. For example, the operations of FIGS. 2, 3, and 6 may be performed in any suitable combination to detect routing anomalies in accordance with the disclosed technologies. At 602, the method includes receiving data for a BGP advertisement message (e.g., BGP data representing the BGP advertisement message). For example, the data for the BGP advertisement message may be received from a data collector (e.g., data collectors 103 of FIG. 1) as part of a subscription to a BGP message feed and/or directly from a router or route reflector in the network. As described above, in some examples, the data for the BGP advertisement message may be received based on a relevance to a targeted one or more ASNs (e.g., the BGP data for the BGP advertisement message may include an AS path that includes the targeted one or more ASNs).

At 604, the method includes analyzing the AS path in the BGP data to determine whether an anomaly is present in an associated advertised route. For example, one or more of the evaluations performed in the analysis operations of method 300 of FIG. 3 may be applied to the AS path to determine whether any one of a plurality of types of anomalies are present (e.g., route leaks, spoofed ASNs, etc.).

At 606, the method includes outputting an alert responsive to detecting the anomaly. For example, as described above, the alert may identify the type of anomaly and may be output to an operator/administrator and/or to an automated system. In some examples, the alert may be configured to provide the operator/administrator and/or the automated system with information that suggests an associated mitigation operation for the anomaly, which may include a follow-on task to address the anomaly (e.g., performing further analysis of the anomaly/BGP advertisement/routing/ etc., performing an adjustment to the network, such as a change in routing advertisements as described above, to address the anomaly, etc.). Accordingly, the alert may be usable to identify and perform a mitigation operation to address the anomaly.

Figure 7:
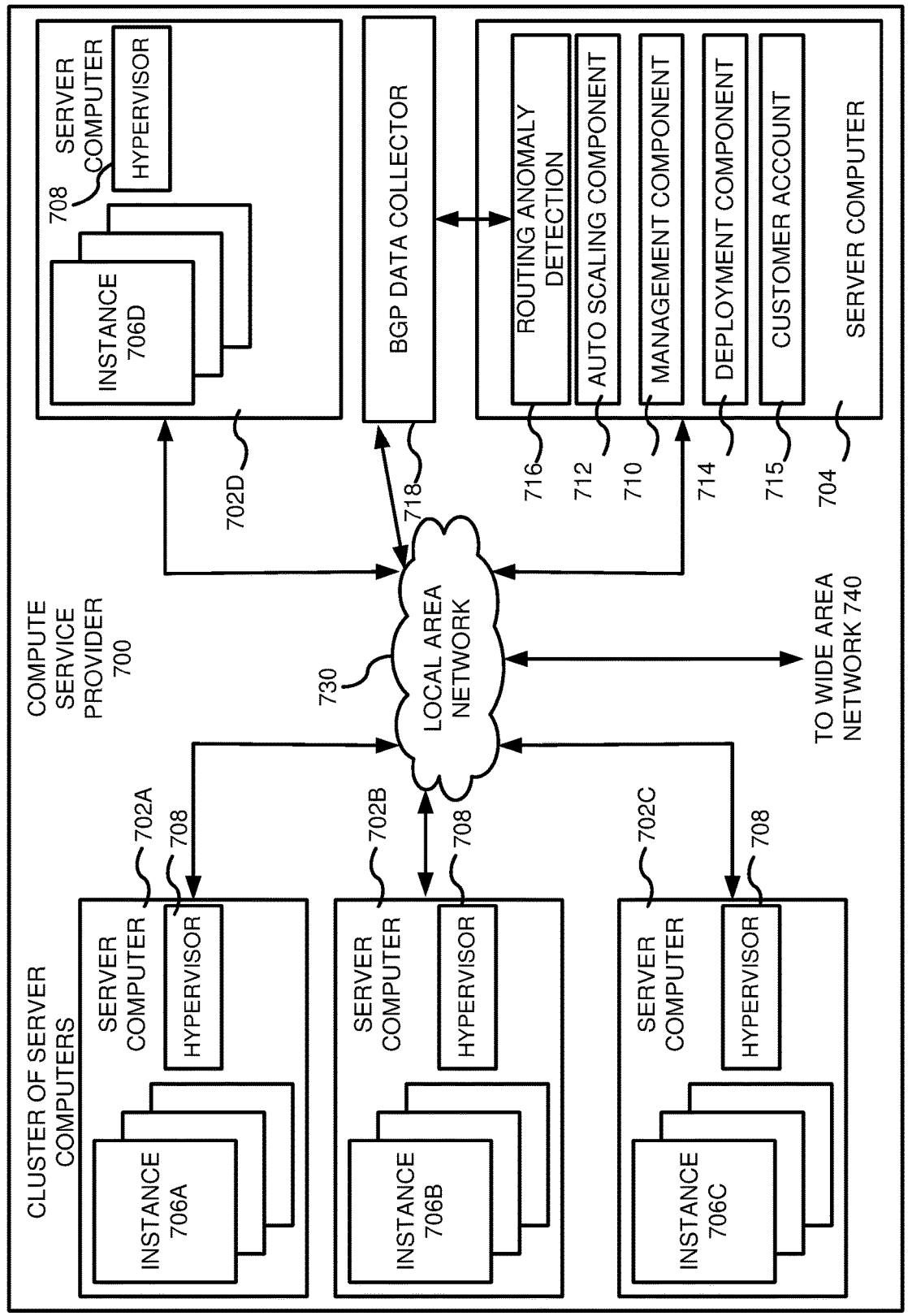
FIG. 7 is an example system diagram showing a plurality of virtual machine instances running in the multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

In some implementations of the disclosed technology, the computer service provider 700 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/ or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service (s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. For example, the server computers 702A-702D may include storage devices configured to store data (e.g., including instructions for executing software instances 706A-706D and/or data usable by instances 706A-706D in some examples). In one embodiment, the instances 706A-706D are virtual machines. As known in the art, a virtual machine is an instance of a software implementation of a machine (i.e., a computer) that executes applications like a physical machine. In the example of virtual machine, each of the servers 702A-702D can be configured to execute a hypervisor 708 or another type of program configured to enable the execution of multiple instances 706 on a single server. Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more of the server computers in the compute service provider may include at least some of the components of system 100 of FIG. 1. For example, one or more of the servers may include a BGP data collector, routing anomaly detection service, and/or router as described in FIG. 1 above. In some examples, a BGP data collector 718 may be connected to local area network 730 to provide BGP message data to a routing anomaly detection service executing on one of the server computers, such as routing anomaly detection service 716 of server 704. The routing anomaly detection service 716 may perform analysis on AS paths and/or other BGP message data received from collector 718, such as described above with respect to service 102 of FIG. 1 and the operations performed in methods 200 and 300 of FIGS. 2 and 3, respectively.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multitenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can be a local area network (LAN) and can be connected to a Wide Area Network (WAN) 740 so that end customers can access the compute service provider 700. It should be appreciated that the network topology illustrated in FIG. 7 has been simplified and that many more networks and networking devices can be utilized to interconnect the various computing systems disclosed herein.

Figure 8:
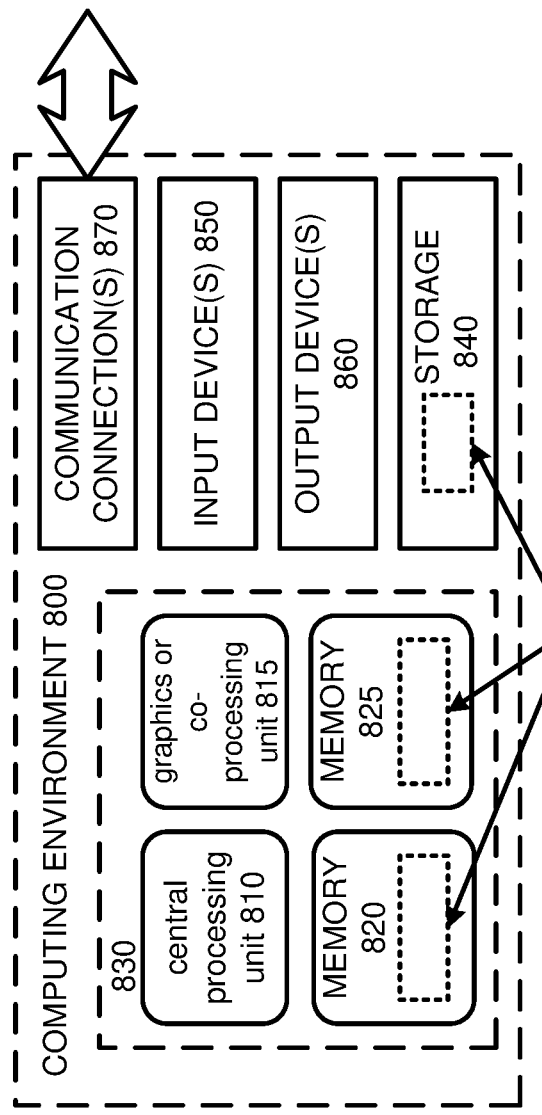
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.). In some examples, one or more components of the computing environment may be included in the BGP data collectors 103 and/or routing anomaly detection service 102 of FIG. 1, and/or any other devices described herein. In additional or alternative examples, one or more components of FIG. 1 may be examples of components of the computing environment 800, as described below.

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). For example, one or more of the memory 820, 825 may store data, such as lists of exceptions for analysis (described in more detail above with respect to FIGS. 1 and 3) and/or may include instructions to perform the operations described above with respect to FIGS. 2 and 3 and/or the operations of the routing anomaly detection service 102. In additional or alternative examples, one or more of the memory 820, 825 stores software 880 implementing one or more innovations described herein, in the form of computer-executable instructions suitable for execution by the processing unit(s). For example, one or more of the memory 820, 825 may store instructions for performing analysis of AS paths in BGP messages to detect routing anomalies in a network.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. In some examples, the storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computing system comprising:
   a route anomaly detection service for a network, the route anomaly detection service comprising:
   a processor, and
   a storage device storing instructions executable by the processor to:
   subscribe to a feed of Border Gateway Protocol (BGP) data representing BGP messages transmitted in a network;
   receive, from one or more data collectors for the network, the BGP data for the BGP messages via the feed; and
   for each BGP message represented in the received BGP data:
   process the BGP data corresponding to the BGP message to normalize the BGP data, including extracting an Autonomous System (AS) path and prefixes for a route advertisement in the BGP message;
   analyze the AS path by performing a series of evaluations to determine whether different types of anomalies are detected in the AS path, wherein the series of evaluations includes an evaluation configured to detect an anomaly corresponding to a route leak or an evaluation configured to detect an anomaly corresponding to a route advertisement spoof, wherein the evaluation configured to detect the anomaly corresponding to the route advertisement spoof is a first evaluation including analysis to determine whether the AS path includes an AS number that is in a corresponding list of AS numbers and that is in an unexpected position of the AS path relative to a peering AS number, and wherein the evaluation configured to detect the anomaly corresponding to the route leak is a second evaluation including analysis to determine whether a client is re-advertising a route from the route advertisement in an unauthorized manner; and
   responsive to detecting an anomaly in the AS path, outputting an alert indicating a type of the anomaly, wherein the alert is usable to perform a mitigation operation to address the anomaly.

2. The computing system of claim 1, wherein the series of evaluations includes determining whether the AS path includes an exception that results in a determination that the AS path is non-anomalous.

3. The computing system of claim 2, wherein the exception includes a determination that a subset of the AS path is included in a list of allowed AS paths or the route advertisement is being leaked from an AS that is included in a list of permitted AS numbers.

4. The computing system of claim 1, wherein the corresponding list of AS numbers is a list of AS numbers expected to be adjacent to a peering AS number, and wherein the first evaluation includes analysis to determine whether the AS path includes an AS number that is in the corresponding list and that is not adjacent to the peering AS number in the AS path, and wherein the first evaluation is performed prior to a second evaluation.

5. The computing system of claim 4, wherein the second evaluation is performed prior to a third evaluation, the third evaluation including analysis to determine whether a route from the route advertisement is being re-advertised to a transit provider in the network in an unauthorized manner.

6. The computing system of claim 4, wherein the instructions are further executable to compare the prefixes for the route advertisement to associated expected prefixes for the route advertisement.

7. A method comprising:
   receiving Border Gateway Protocol (BGP) data for a BGP advertisement message advertising a route in a network;
   analyzing an Autonomous System (AS) path in the BGP data to determine whether an anomaly is present in the advertised route, wherein analyzing the AS path in the BGP data includes serially performing a plurality of evaluations to determine whether different types of anomalies are detected in the AS path, wherein the plurality of evaluations includes a first evaluation configured to detect a first type of anomaly corresponding to a route advertisement spoof and a second evaluation configured to detect a second type of anomaly corresponding to a route leak; and
   outputting an alert responsive to detecting the anomaly, the alert usable to perform a mitigation operation to address the anomaly.

8. The method of claim 7, wherein outputting the alert comprises outputting an alert identifying the first type of anomaly responsive to detecting the first type of anomaly with the first evaluation or identifying the second type of anomaly responsive to detecting the second type of anomaly with the second evaluation.

9. The method of claim 7, wherein analyzing the AS path in the BGP data includes determining whether the AS path includes an exception, and, responsive to determining that the AS path includes an exception, logging a result indicating that the AS path is non-anomalous.

10. The method of claim 7, further comprising processing the BGP data to generate a normalized BGP data set including the AS path prior to analyzing the AS path.

11. The method of claim 7, further comprising comparing prefixes in the BGP data to associated expected prefixes for the advertised route and, responsive to identifying a mismatch between the prefixes in the BGP data and the associated expected prefixes, outputting an indication of the mismatch.

12. A computing system providing a routing anomaly detection service for a network, the computing system comprising:
   one or more processors; and
   a memory storing instructions executable by the one or more processors to:
      receive Border Gateway Protocol (BGP) data for a BGP advertisement message advertising a route in a network, the BGP data including an Autonomous System (AS) path for the route and prefixes for the route;
      performing a first evaluation to determine whether the AS path includes an AS number from a first list of AS numbers that is in an unexpected position of the AS path relative to a peering AS number;
      responsive to determining that the AS path includes an AS number from the first list that is in the unexpected position, outputting a first alert indicating a probable routing advertisement spoof;
      responsive to determining that the AS path does not include any AS numbers that are in the first list and in the unexpected position, performing a second evaluation to determine whether the AS path indicates that a client is re-advertising the route in an unauthorized manner; and
      responsive to determining that the AS path indicates that the client is re-advertising the route in an unauthorized manner, outputting a second alert indicating a route leak.

13. The computing system of claim 12, wherein the BGP advertisement message is one of a plurality of BGP messages represented in the BGP data, wherein the BGP data is received from one or more BGP data collectors, and wherein respective instances of the first and second evaluations are performed using AS paths in BGP data for each of the plurality of BGP messages.

14. The computing system of claim 13, wherein the instructions are further executable to normalize the BGP data for the plurality of BGP messages, including extracting respective AS paths and respective prefixes for each BGP message of the plurality of BGP messages and selectively removing portions of the AS paths.

15. The computing system of claim 13, wherein the BGP data for the plurality of BGP messages is received responsive to a subscription to a feed of BGP data relating to a specified list of AS numbers.

16. The computing system of claim 12, wherein the instructions are further executable to perform a mitigation operation in the network based on the first alert or the second alert.

17. The computing system of claim 12, wherein the instructions are further executable to terminate further evaluation of the AS path responsive to determining that the AS path is subject to one or more exceptions including a first exception that the AS path is included in a list of allowed AS paths or a second exception that the route advertised by the BGP advertisement message is being leaked from an AS that is included in a list of permitted AS numbers.

18. The computing system of claim 17, wherein the instructions are further executable to perform a third evaluation responsive to determining that the AS path is not subject to the one or more exceptions, the third evaluation including an analysis of the AS path to determine whether the route advertised by the BGP advertisement message is being leaked to a transit provider in the network.

* * * * *